United States Patent
Thevenet

(10) Patent No.: US 9,441,788 B2
(45) Date of Patent: Sep. 13, 2016

(54) TANK RESISTANT TO THE OVERPRESSURES CAUSED BY PROJECTILE IMPACT

(71) Applicant: AIRBUS GROUP SAS, Paris (FR)

(72) Inventor: Pascal Thevenet, Avon (FR)

(73) Assignee: AIRBUS GROUP SAS, Blagnac (FR)

(*) Notice: Subject to any disclaimer, the term of this patent is extended or adjusted under 35 U.S.C. 154(b) by 0 days.

(21) Appl. No.: 14/432,199

(22) PCT Filed: Oct. 4, 2013

(86) PCT No.: PCT/FR2013/052364
§ 371 (c)(1),
(2) Date: Mar. 28, 2015

(87) PCT Pub. No.: WO2014/053787
PCT Pub. Date: Apr. 10, 2014

(65) Prior Publication Data
US 2015/0240994 A1   Aug. 27, 2015

(30) Foreign Application Priority Data
Oct. 4, 2012 (FR) ..................... 12 59425

(51) Int. Cl.
| | |
|---|---|
| F17C 1/16 | (2006.01) |
| B64D 37/32 | (2006.01) |
| F17C 13/02 | (2006.01) |
| B60K 15/03 | (2006.01) |

(52) U.S. Cl.
CPC ............... *F17C 1/16* (2013.01); *B60K 15/03* (2013.01); *B64D 37/32* (2013.01); *F17C 13/025* (2013.01); *B60K 2015/03407* (2013.01); *B64D 2037/325* (2013.01); *F17C 2201/01* (2013.01); *F17C 2203/066* (2013.01); *F17C 2260/011* (2013.01)

(58) Field of Classification Search
CPC .... F17C 1/16; F17C 13/025; F17C 2201/01; F17C 2203/066; F17C 2260/011; B60K 15/03; B60K 2015/03407; B64D 37/32; B64D 2037/325
USPC .......... 220/560.01, 562, 581, 585, 586, 588, 220/560.12, 560.15, 592.09, 592.25, 592.26
See application file for complete search history.

(56) References Cited

U.S. PATENT DOCUMENTS

| | | |
|---|---|---|
| 3,506,224 A | 4/1970 | Harr et al. |
| 3,567,536 A | 3/1971 | Wickersham, Jr. |
| 3,698,587 A | 10/1972 | Baker et al. |
| 3,787,279 A | 1/1974 | Winchester |
| 4,469,295 A | 9/1984 | Schuster |
| 4,925,057 A | 5/1990 | Childress et al. |
| 5,476,189 A * | 12/1995 | Duvall ............... F17C 1/16 220/588 |

(Continued)

FOREIGN PATENT DOCUMENTS

EP    2048079 A2    4/2009

*Primary Examiner* — Robert J Hicks
*Assistant Examiner* — Kareen Thomas
(74) *Attorney, Agent, or Firm* — Im IP Law PLLC; C. Andrew Im

(57) ABSTRACT

A tank for storing liquid configured to withstand overpressures caused by a projectile impact and positioned in a structure. The tank includes an overpressure management device having a layer of polyethylene-based hyperelastic foam. An expansion in a simple, durable and passive manner is sought both for existing tanks and for new tanks.

6 Claims, 2 Drawing Sheets

(56) References Cited

U.S. PATENT DOCUMENTS

| | | | | |
|---|---|---|---|---|
| 5,522,340 A | * | 6/1996 | Skogman | B63B 5/24 114/357 |
| 7,566,489 B2 | | 7/2009 | Starke | |
| 8,480,033 B2 | * | 7/2013 | Shannon | B64D 37/02 244/135 B |

* cited by examiner

TANK RESISTANT TO THE OVERPRESSURES CAUSED BY PROJECTILE IMPACT

RELATED APPLICATIONS

This application is a §371 application from PCT/FR2013/052364 filed Oct. 4, 2013, which claims priority from French Patent Application No. 12 59425 filed Oct. 4, 2012, each of which is herein incorporated by reference in its entirety.

TECHNICAL FIELD OF THE INVENTION

The present invention relates the field of liquid tanks, such as for example fuel tanks, and more particularly a tank comprising a device that makes it possible to deal with the overpressure generated by a projectile passing through a liquid-filled tank.

BACKGROUND OF THE INVENTION

The problem, when the liquid of a bladder tank or tank built into a structure, such as for example an aircraft or a land-based vehicle, is passed through by a projectile, is that of the overpressure that is generated. This overpressure within the liquid may lead to the destruction of the tank by rupture.

Indeed, the projectile displaces, over its trajectory, a volume of liquid which, by nature, is generally incompressible.

In current tanks, there is no possible expansion of the volume containing the liquid, when a projectile passes through the liquid, which means that a pressure is applied increasingly to the walls of the tank until the walls of the tank rupture. More specifically, the interaction between the projectile and the fluid produces, for the first one, a loss of kinetic energy and, for the second one, an increasing displacement which, if it is not compensated for, will cause this pressure rise. The resulting pressure wave will then strike the wall of the fuel tank over a relatively large zone and, as a function of the amplitude of this wave and the construction of the fuel tank, may break the wall of the tank.

Currently, no tank makes it possible to completely manage this bulk pressure. The risk of losing an aircraft or vehicle by explosion of the tank after a ballistic impact is therefore very high.

Certain bladder tanks, in particular those equipped with a double wall surrounding a foam with a self-sealing function after perforation, for example in the case of certain military aircraft, may optionally limit the effects of gunfire. However, such a foam is far from being suitable for absorbing the overpressure generated by the penetration of the projectile.

Various known techniques may respond more or less to the objective of reducing the vulnerability of a tank faced with a ballistic threat. These techniques that aim to reduce the effects of overpressure are the following:

nesting of two tanks (also referred to as a "tank in tank" system), the one inside the largest one having to break under the ballistic impact and empty its contents into the other,
  use of a rubber coating inside the tank (also referred to as "rubber layers around tank"), making it possible to separate the fluid from the structure that forms the tank,
  use of a fiber-reinforced rubber coating inside the tank, which is a derivative of the preceding concept,
  use of a Kevlar bladder tank filled with open-cell foam (also referred to as "foam in bladder tank"),
  use of a bladder tank with inflatable walls (also referred to as a "nitrogen inflated ballistic bladder" system), described in U.S. Pat. No. 4,925,057,
  use of corrugated reinforcements made of glass fibers/resin bonded between the rigid-walled tank and the structure containing the latter (taking up a principle described in U.S. Pat. No. 4,469,295 and U.S. Pat. No. 7,566,489) and that can be deformed under the effect of overpressure,
  use of a sacrificial layer lining the inside of the tank, made of honeycomb blocks covered with a skin made of glass fibers/resin (for sealing the cells), that can be crushed under the effect of overpressure.

However, these tanks are not suitable for high pressures and furthermore do not make it possible to limit the damage caused by several successive or simultaneous projectile impacts.

Also known from patent EP 2048079 is a fuel tank assembly and a corresponding method that makes it possible to limit the damage that the impact of a ballistic projectile could cause, in particular hole-type damage that promotes a leakage of fuel. This patent describes a double tank formed by two nested bladders and that is thus capable of limiting the damage caused by a ballistic impact. The assembly also comprises a plurality of connectors positioned between the two bladders in order to at least partially limit the expansion of the bladder. Thus, this assembly makes it possible to limit the expansion of the internal bladder, but does not make it possible to prevent the explosion of the tank if the pressure exerted by the volume expansion of the fuel during the penetration of the projectile is too high.

Lastly, a product based on polyurethane foam is known that protects fuel tanks solely against electrostatic effects and sloshing, while providing the inerting of the vapors and a barrier against external debris. This system does not make it possible to manage the overpressures generated by a ballistic impact.

OBJECT AND SUMMARY OF THE INVENTION

The objective of the present invention is therefore to overcome one or more of the drawbacks from the prior art by proposing a tank suitable for withstanding the overpressures generated by a projectile impact.

More specifically, the present invention proposes a device for managing overpressures within a liquid tank.

For this, the present invention proposes a tank, for liquid, suitable for withstanding overpressures caused by a projectile impact and positioned in a structure, said tank comprising an overpressure management device.

The improvement therefore relates to the expansion of the volume containing the liquid by means of a very simple suitable mechanical device.

The objective of the invention is to obtain an expansion in a simple, durable and passive manner both for existing tanks and for new tanks to be designed. The term "durable" should be understood to mean the ability to obtain successive expansions if several projectiles pass through the tank over time. In other words, the mechanical device should not be a consumable.

According to the invention, the overpressure management device comprises a layer of hyperelastic foam. The term "hyperelastic foam" is understood to mean a foam capable of being compressed greatly under loading and of regaining its initial shape after unloading. It is preferably a polyethylene-based foam.

According to one embodiment of the invention, the device is positioned inside the tank, in particular when the tank is an integral part of a structure such as, for example, a wing or fuselage.

According to one embodiment of the invention, the device is positioned outside of the tank, between the flexible outer wall of the tank and the structure containing the latter.

According to one embodiment of the invention, the thickness of the hyperelastic foam layer is adjusted as a function of the desired expansion volume.

According to one embodiment of the invention, the thickness of the hyperelastic foam layer is between 5 and 15 mm.

According to one embodiment of the invention, the device covers at least four sides of the tank when the tank has a parallelepipedal shape.

According to one embodiment of the invention, the hyperelastic foam is a closed-cell foam.

BRIEF DESCRIPTION OF THE DRAWINGS

Other features and advantages of the invention will be better understood and will appear more clearly on reading the description given below with reference to the appended figures which are given by way of example.

DETAILED DESCRIPTION OF THE EMBODIMENTS

The present invention relates to a simple, passive, entirely mechanical device that makes it possible to obtain the expansion of a tank containing a liquid.

Within the context of the invention, the tank is for example a bladder tank or a built-in tank. The term "bladder tank" is understood to mean a tank formed by an envelope which is not the structure in which it is positioned. The term "built-in tank" is understood to mean a tank formed by the structure in which it is positioned.

The liquid present in the tank is for example fuel.

The walls of the tank define the liquid storage volume. The tank is positioned in a structure, and for example in an aircraft structure. The tank may also be positioned in a land-based vehicle structure or any other type of structure comprising a tank that may be filled with liquid.

The device used for countering the effects due to a projectile passing through the liquid consists of a layer of foam. The foam used within the context of the present invention has a hyperelastic mechanical behavior. Indeed, it is important that the device makes it possible to manage the pressure increase due to the penetration of a projectile into the tank, but also makes it possible to manage successive or simultaneous pressure increases. For this, it is necessary for the foam, after having been compressed under the effect of the overpressure, to rapidly regain its initial shape. Furthermore, the compressive stiffness of the foam layer must be such that it should weakly stress the structure that supports it, whether in the presence or absence of an added tank.

The term "hyperelastic foam" is understood to mean a foam capable of being compressed greatly under loading and of regaining its initial shape after unloading. A polyethylene foam such as Ethafoam® 900, the properties of which are specified in table 1, exhibits such a behavior. Other references of hyperelastic foams may be used.

TABLE 1 properties of the hyperelastic foam.

| Physical properties | Values |
| --- | --- |
| Density | 140 kg*m³ |
| Compression set | <5% |
| Compression level: | Stress level |
| 10% | 400 kPa |
| 25% | 500 kPa |
| 50% | 700 kPa |

The solution proposed within the context of the present invention thus approaches that of a "sacrificial layer" but using a material having suitable mechanical behavior.

Depending on the type of tank used, the device according to the invention will be positioned in the built-in tank or outside of the flexible-walled tank.

Figure 1:
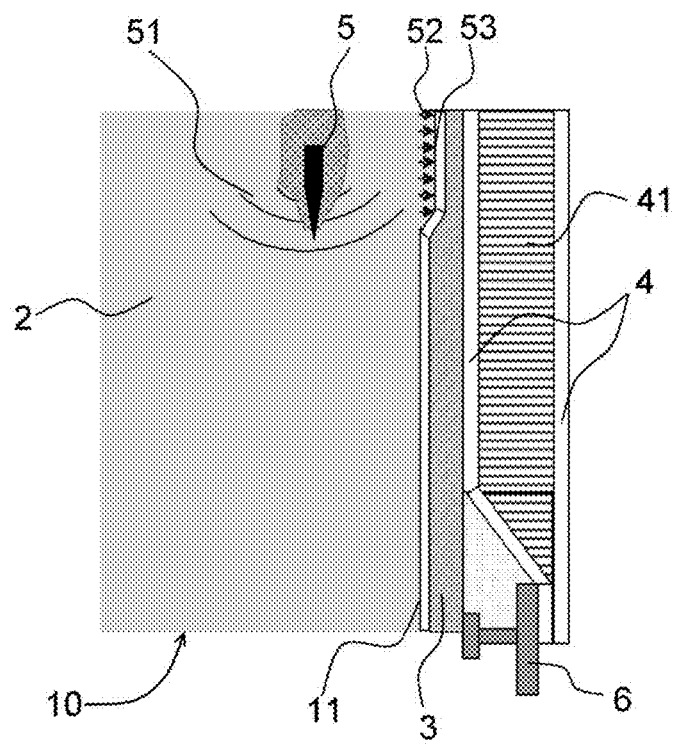
FIG. 1 is a schematic representation of a cross-sectional view of one part of a variant of the tank according to one embodiment of the invention.

More specifically, according to one variant of the invention illustrated in FIG. 1, in the case of a bladder tank, the device is positioned between the structure and the outer wall of said tank. In this variant, the liquid 2 is stored in the internal volume of the tank 10. The projectile 5, on penetrating into the tank 10, creates waves 51 which will exert an overpressure 52 and deform the wall 53 of the tank 10. This deformation is absorbed by the foam layer 3 positioned between the structure 4 and the tank 10.

According to one embodiment, the structure is composed of two composite skins, positioned between which is, for example, a layer of honeycomb material 41. The foam layer is inserted between the wall of the bladder tank and the sandwich panel thus constructed. The mechanical strength of this structure 4 is greater than the mechanical strength of the foam. The sandwich panel may comprise an attachment support 6.

In this type of variant, that is to say a bladder tank 10 housed in the fuselage or wing, an open-cell or closed-cell foam may be used. Indeed, the liquid is not directly in contact with the foam, it is not therefore necessary for it to be a closed-cell foam.

Figure 2:
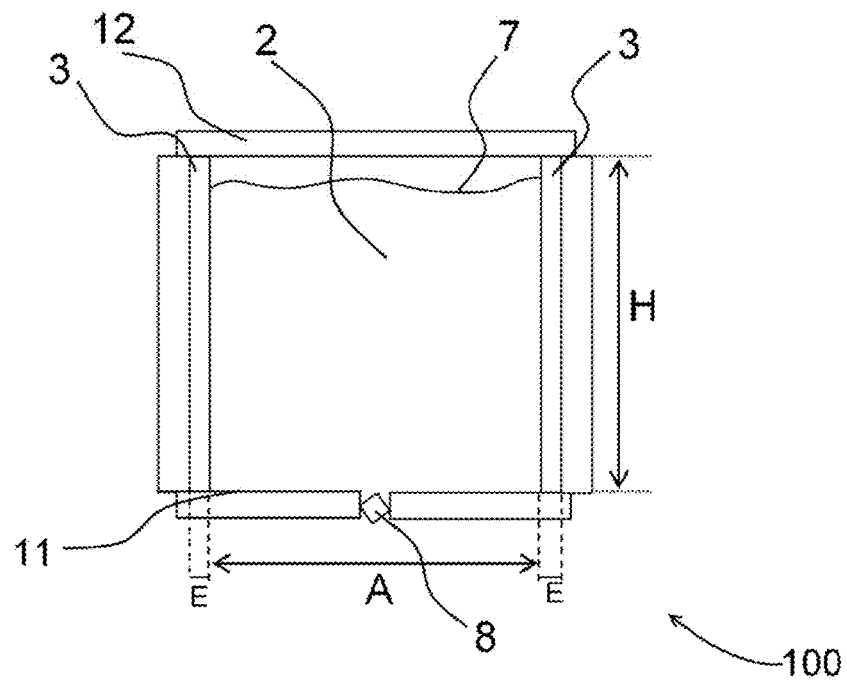
FIG. 2 is a schematic representation of a median cross-sectional view of a variant of the tank according to one embodiment of the invention.

According to another variant of the invention illustrated in FIG. 2, in the case of a built-in tank 100, that is to say a tank formed by the structure of the aircraft, the foam 3 lines the inner wall 11 of said tank 100 over at least 4 sides. In this variant, the walls 12 of the tank may be formed directly by the structure, for example of the aircraft. The projectile 8 is represented in one wall, in the perforation phase. The level of liquid in the tank 100 is illustrated by the line 7.

In this type of variant, that is to say in the case of a tank 100 built, for example, into the fuselage or a wing, the foam in direct contact with the fuel is preferably a closed-cell foam in order to avoid any migration of liquid into the cells.

In the two types of variants, bladder tank or built-in tank, when the tank is of parallelepipedal shape, and for example cubic or rectangular shape, the foam is preferably positioned on at least four sides parallel to the trajectory of the projectile. According to one embodiment, the foam lines all of the sides of the tank.

According to one embodiment, the hyperelastic foam layer has a thickness of between 5 and 15 mm, and preferably equal to 10 mm.

According to one variant of the invention, the foam used may be a closed-cell foam based on polyethylene (PE), such as that presented under the trade name Ethafoam® 900.

According to one variant of the invention, such a device may be used by designers of bladder tanks, and for example for double-walled tanks equipped originally with a foam having mainly the self-sealing function, via chemical reaction with the fuel, in the event of perforation. The addition of the foam between two elastomer walls makes it possible in addition to manage the overpressure due to the penetration of a projectile.

An updating of existing tanks, but also the design of new built-in tanks incorporating the device according to the invention, may be envisaged.

In all these types of applications, the fact of using a foam having hyperelastic behavior makes it possible to guarantee effective use over the service life.

Indeed, in the case for example of a military aircraft, the ballistic threat is not a single threat, several projectiles may reach and pass through the tank successively and/or simultaneously. Multiple and successive expansions of the volume containing the fuel are therefore necessary. A hyperelastic foam thus makes it possible to respond to requirements of this type and thus to limit the risk of losing the aircraft via explosion of the tank not equipped with this foam layer, after a ballistic impact.

EXEMPLARY EMBODIMENT OF THE INVENTION

The proposed solution is implemented by means of numerical simulations in order to show the benefit provided by a hyperelastic foam.

The example relates to a cubic tank (illustrated in FIG. 2, median cross-sectional view) having dimensions of 200 mm (H)×200 mm (A)×200 mm in two configurations:
completely filled,
90% filled.

All the walls are assumed to be infinitely rigid and four of them at the periphery bear a layer of foam:
either made of rigid polyurethane (PU), or
made of Ethafoam® 900 polyethylene (PE) according to the invention.

In both cases, the thickness of the foam is 10 mm. An 8 mm cubic projectile arrives at the initial velocity of 250 m/s in the liquid domain.

During the simulations the overall reaction force is noted as a function of the time for each rigid wall bearing a layer of foam.

Figure 3:
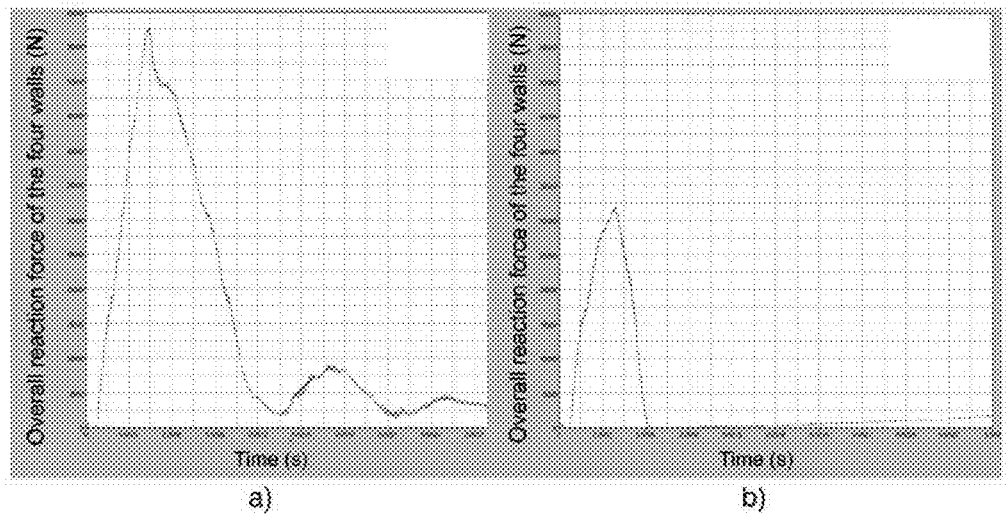
FIG. 3 illustrates the results (overall reaction force of the four walls as a function of time) obtained for a tank according to the prior art a) completely filled, b) 90% filled.

FIG. 3a illustrates the results obtained in the presence of a completely filled tank provided with a rigid PU foam, the force peak reaches around 57 800 N, i.e. a mean pressure of greater than 14 bar. When the tank, still provided with the same foam, is 90% filled (FIG. 3b), the force peak is brought down to around 31 800 N, i.e. a mean pressure close to 9 bar.

Figure 4:
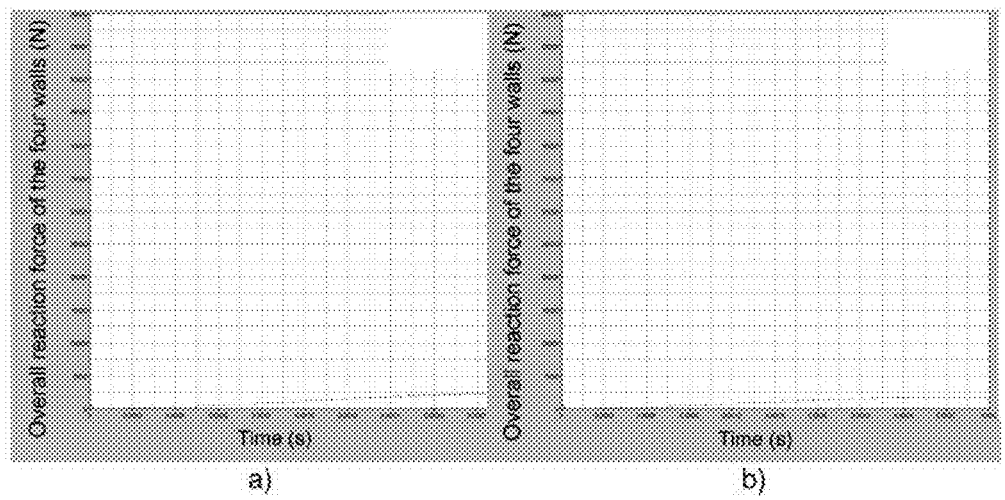
FIG. 4 illustrates the results (overall reaction force of the four walls as a function of time) obtained for a tank according to the invention a) completely filled, b) 90% filled.

FIG. 4a illustrates the results obtained in the presence of a completely filled tank provided with an Ethafoam® 900 PE foam with 100% filling, the maximum force is around 2430 N, i.e. a mean pressure of around 0.6 bar. The tank, still provided with the same foam, is 90% filled (FIG. 4b), the reaction force remains less than 1800 N, i.e. a mean pressure of less than 0.5 bar.

These simulation results are significant since a reduction in the overpressure of 95% for a 100% filled tank or 90% filled tank provided with hyperelastic PE foam is observed. The performance of the hyperelastic PE foam, such as Ethafoam® 900, is considerably greater than that which can be obtained with a rigid PU foam.

The invention claimed is:

1. A tank for storing liquid, comprising an overpressure management device comprising a layer of polyethylene-based hyperelastic foam to armor the tank to withstand overpressures caused by a projectile impact, the tank being positioned in a structure; and wherein a thickness of the polyethylene-based hyperelastic foam layer is adjusted as a function of a predetermined expansion volume.

2. The tank as claimed in claim 1, wherein the overpressure management device is positioned inside the tank.

3. The tank as claimed in claim 1, wherein the overpressure management device is positioned outside of the tank, between an outer wall of the tank and the structure.

4. The tank as claimed in claim 1, wherein a thickness of the polyethylene-based hyperelastic foam layer is between 5 and 15 mm.

5. The tank as claimed in claim 1, wherein said tank having a parallelepipedal shape; and wherein the overpressure management device covers at least four sides of said tank.

6. The tank as claimed in claim 1, wherein the polyethylene-based hyperelastic foam is a closed-cell foam.

* * * * *